United States Patent [19]

Wagner et al.

[11] Patent Number: 5,109,035

[45] Date of Patent: Apr. 28, 1992

[54] PROCESS FOR THE PRODUCTION OF MOLDINGS OR FILMS OF CROSS-LINKED POLYISOCYANATE POLYADDUCTS AND THE MOLDINGS THUS OBTAINED

[75] Inventors: Joachim Wagner; Werner Rasshofer, both of Cologne; Thomas Elsner, Duesseldorf; Hans-Albrecht Freitag, Leichlingen, all of Fed. Rep. of Germany

[73] Assignee: Bayer Aktiengesellschaft, Bayerwerk, Fed. Rep. of Germany

[21] Appl. No.: 628,766

[22] Filed: Dec. 17, 1990

[30] Foreign Application Priority Data

Dec. 22, 1989 [DE] Fed. Rep. of Germany ....... 3942468

[51] Int. Cl.$^5$ ........................................... C08G 18/14
[52] U.S. Cl. ................................. 521/167; 521/170; 521/176; 264/51; 428/304.4; 428/317.9; 428/423.1
[58] Field of Search ...................... 521/167, 170, 176; 264/51; 428/304.4, 317.9, 423.1

[56] References Cited

U.S. PATENT DOCUMENTS 3,263,010  7/1966  Shultz ................................. 264/126
4,129,697 12/1978  Schapel et al. .................... 521/176

FOREIGN PATENT DOCUMENTS 2461399  7/1976  Fed. Rep. of Germany .
3733756  4/1989  Fed. Rep. of Germany .
1360019  7/1974  United Kingdom .
1411958 10/1975  United Kingdom .

OTHER PUBLICATIONS

Kunststoffhandbuch 1983, 428, Thermoplastic polyurethane.

Primary Examiner—Maurice J. Welsh
Attorney, Agent, or Firm—Joseph C. Gil

[57] ABSTRACT

The present invention is directed to a process of thermoplastically molding a specific foam composition. The composition is formed by reacting an isocyanate and a relatively low molecular weight tri or higher polyol in the presence of a blowing agent.

7 Claims, No Drawings

PROCESS FOR THE PRODUCTION OF MOLDINGS OR FILMS OF CROSS-LINKED POLYISOCYANATE POLYADDUCTS AND THE MOLDINGS THUS OBTAINED

BACKGROUND OF THE INVENTION

The present invention relates to a process for the production of moldings or flat materials abased on foamed polyisocyanate polyadducts containing urethane groups and optionally urea groups by molding. Foamed materials of which the density is increased during thermoplastic molding are used as the polyisocyanate polyadducts. The invention also relates to the moldings thus obtained. The polyisocyanate polyadducts useful herein are thermoplastically moldable, but are not truly thermoplastic. In other words, the polyadducts soften under the heat and pressure conditions of the molding process to such an extent that they can be shaped without ever passing into the liquid state. True thermoplastics on the other hand are solid at room temperature and become liquid at higher temperatures.

It is known that moldings or flat materials can be produced by thermoplastically molding polyurethanes (cf. for example Becker/Braun, Kunststoffhandbuck, Vol. 7, "Polyurethane", Carl Hanser Verlag, Munchen/Wien (1983), pages 428 et seq). The earliest known thermoplastic polyurethane elastomers were based on diisocyanates, relatively high molecular weight dihydroxy compounds (and more particularly relatively high molecular weight polyester diols) and low molecular weight diols as chain extenders. The polyurethanes had a linear structure, i.e. no crosslinkages or branches were in the molecule. The thermoplastic molding of polyurethanes having branched molecular structure is also known. Thus, German Offenlegungshriften 2,461,399, 2,164,381, 2,032,174 and 2,607,380, for example, describe the production and thermoplastic molding of polyurethane foams. German Offenlegungshrift 3,733,756 relates to the production of moldings or films based on polyisocyanate polyadducts having a density of at least 0.8 g/cm$^3$. The polyisocyanate polyadducts are produced from i) isocyanate-reactive group containing compounds with molecular weights of from 1,800 to 1,200 and having a functionality in the context of the isocyanate addition reaction of at least 2.5 and ii) low molecular weight, preferably difunctional compounds containing isocyanate-reactive groups, and iii) isocyanates. According to the teaching of German Offenlegungshrift 3,733,756, the thermoplastically moldable polyisocyanate polyadducts may also contain fillers and reinforcing materials.

DESCRIPTION OF THE INVENTION

It has now surprisingly been found that particularly high-quality moldings and films based on polyisocyanate polyadducts can be obtained by a variant of the above processes in which a foamed polyisocyanate polyadduct preferably containing fillers and/or reinforcing materials had having a density of 0.3 to 1.2 g/cm$^3$ is initially prepared using low molecular weight, isocyanate-reactive compounds which contain at least three isocyanate reactive groups. The polyadduct thus produced is subsequently subjected to molding with simultaneous irreversible compression and an increase in density.

The present invention relates to a process for the production of moldings or films from foamed polyisocyanate polyadducts by thermoplastically molding at temperatures of at least 50° C. under pressures of at least 5 bar. The foamed polyisocyanate polyadducts used may contain fillers and/or reinforcing materials in a quantity of up to 80% by weight, based on the total weight. The polyadducts have a density of 0.3 to 1.2 g/cm$^3$ and are obtained by reacting a) organic polyisocyanates and b) aliphatic or cycloaliphatic polyols which may contain ether and/or ester groups and, which have molecular weights in the range from 92 to 1,799 and hydroxyl functionalities of at least 3, c) blowing agents, optionally with one or more of the following components d) through g):

d) compounds having molecular weights of 1,800 to 12,000 which, on a statistical average, contain at least 2.5 isocyanate-reactive groups, e) diamines containing two primary and/or secondary aromatically bound amino groups having molecular weight of from 108 to 400, f) aliphatic diols, cycloaliphatic diols, aliphatic polyamines and/or cycloaliphatic polyamines which may contain ether groups and which have molecular weights of from 60 to 1,799 g) other auxiliaries and additives known per se from polyurethane chemistry, in one or more stages at an isocyanate index of from 62 to 200, with the proviso that component b) is used in such a quantity that the total quantity of component b) is at least 5% by weight, based on the weight of components a), b) and d) through f) and the temperature and pressure conditions prevailing during molding of the material are selected so that the resulting moldings have a density at least 10% higher than the density of the polyisocyanate polyadducts used. The present invention also relates to the moldings obtained by this process.

The polyisocyanate polyadducts used in the process according to the invention are foamed plastics having a density in the range from 0.3 to 1.2 g/cm$^3$ and preferably in the range from 0.5 to 1.0 g/cm$^3$ which preferably contain fillers and/or reinforcing materials in a quantity of up to 80% by weight, based on the total weight. In a particularly preferred embodiment, these materials are semirigid to rigid foams having a Shore D hardness of at least 40 and preferably of at least 45. The foams preferably contain up to 80% by weight and, more preferably, from 20 to 60% by weight fillers and/or reinforcing materials. As already mentioned, the polyisocyanate polyadducts are foams, i.e. plastics, of which the density corresponds to at most 90% and preferably to at most 70% of the density of the corresponding non-porous material.

The polyisocyanate polyadducts are produced in a known manner by reaction of the starting materials mentioned above in one or more stages. The reaction may be carried in closed molds or by free foaming of the starting materials.

Suitable starting materials s) are any organic polyisocyanates, but preferably aromatic polyisocyanates, for example the compounds mentioned in European Patent 81,701, column 3, line 30 to column 4, line 25. In a particularly preferred embodiment, polyisocyanate mixtures of the diphenyl methane series which may be obtained in known manner by phosgenation of aniline/form aldehyde condensates and which have a viscosity at 23° C. of 50 to 500 mPa.s are used as component a).

Component b) is an aliphatic or cycloaliphatic polyol containing at least 3 and preferably 3 or 4 alcoholic hydroxyl groups and having a molecular weight in the range from 92 to 1,799 and preferably in the range from 92 to 399. Suitable polyols include, for example, simple monohydric alcohols, such as glycerol, trimethylol propane, pentaerythritol, or even polyhydric alcohols containing ether groups, such as for example the ethoxylation and/or propoxylation products—having molecular weights in the above-mentioned range—of polyfunctional starter molecules, such as the polyhydric alcohols mentioned or other starters of relatively high functionality, such as ethylenediamine for example. Mixtures of the polyhydric alcohols mentioned by way of example may also be used.

The optical component d) is a compound containing isocyanate-reactive groups and having a molecular weight in the range from 1,800 to 12,000 and preferably in the range from 3,000 to 7,000 or a mixture of such compounds, component d) having an (average) functionality in the context of the isocyanate addition reaction of more than 2.5. The (average) functionality of component d) is preferably from 2.5 to 3.0 and more preferably from 2.8 to 3.0. Compounds particularly suitable as component d) are polyether polyols or mixtures of polyether polyols as disclosed in German Auslegeschrift 2,622,951, column 6, line 65 to column 7, line 47. Polyether polyols of which at least 50% and preferably at least 80% of the hydroxyl groups consist of primary hydroxyl groups are also preferred for the purposes of the present invention. The polyesters, polythioethers, polyacetals, polycarbonates, or polyesteramides containing hydroxyl groups which are disclosed by way of example in German Auslegeschrift 2,622,951 are also suitable in principle as component d) according to the invention, providing they have the requisite functionality and molecular weight, but are less preferred than the polyether polyols.

Aminopolyethers or mixtures of aminopolyethers corresponding to the foregoing observations, i.e. polyethers containing isocyanate-reactive groups of which at least 50 equivalent-% and preferably at least 80 equivalent-% consist of primary and/or secondary, aromatically or aliphatically and preferably aromatically bound amino groups and, for the rest, of primary and/or secondary, aliphatically bound hydroxyl groups, are also suitable as starting component d) Suitable amino polyethers of this type are, for example, the compounds mentioned in European patent 81,701, column 4, line 26 to column 5, line 40. The amino groups in these compounds may also be suitable derivatives, such as, for example, ketimine groups.

Mixtures of the polyhydroxyl compounds mentioned by way of example with the aminopolyethers mentioned by way of example may of course also be used as component d).

The optional component e) is an aromatic diamine of the type mentioned by way of example in European patent 81,701, column 5, line 58 to column 6, line 34. The diamines emphasized therein as preferred are also preferred for the purposes of the invention.

The polyols or polyamines optionally used as the additional synthesis component f) are non-aromatic compounds containing two isocyanate-reactive groups and having molecular weights in the range from 60 to 1,799, preferably in the range from 62 to 500 and more preferably in the range from 62 to 400. Other suitable polyamines are, for example, aliphatic polyamines containing ether groups, for example polypropylene oxides terminated by primary amino groups and having a molecular weight in the above-mentioned range. Polyols containing cycloaliphatic rings, such as for example 1,4-dihydroxycyclohexane or 1,4-bis-hydroxymethyl cyclohexane, are also suitable.

It is important that component b) be used in such a quantity in the production of the foams that the percentage by weight of component b), based on the weight of components a), b), d), e), and f) is at least 5% by weight and preferably at least 10% by weight. In a particularly preferred embodiment, the polyisocyanate polyadducts are produced using only polyols b) as reactant for the polyisocyanates. In any event, it is important to ensure that, where synthesis components d), e) and/or f) are used, the average functionality of all the isocyanate reactive components (i.e., b) and d) through f)) in the context of the isocyanate addition reaction is at least 2.5.

Since the polyisocyanate polyadducts are foams, blowing agents c) known per se must be used, optionally in addition to other auxiliaries and additives g) in their production. Suitable blowing agents c) include both chemical blowing agents and physical blowing agents or even inert gases dissolved in the starting components. Suitable blowing agent are described, for example, in European patent 81,701, column 8, lines 31 to 51 and in the "Kunststoffhandbuch" cited therein.

Preferred auxiliaries and additives g) are the fillers and/or reinforcing materials already repeatedly mentioned which are preferably used in quantities of up to 80% by weight and more preferably in quantities of 20 to 60% by weight, based on the total weight of all the starting components a) to f).

Suitable filler and/or reinforcing materials are, for example, barium sulfate, kieselguhr, whiting, mica or, in particular, glass fibers, LC fibers, glass flakes, glass beads, metal or carbon fibers. However, particularly preferred fillers are sheet-form fillers, such as mats having different weights per unit area, knitted fabrics, woven fabrics, nonwovens, nets, sieves, lattices, etc. of glass, carbon fibers, LC fibers, polyamide fibers, aramide fibers, cellulose fibers, and the like, and also of inorganic materials such as, for example, carbides, metals, such as aluminium, steel or copper.

Other optional auxiliaries and additives g) are, for example, the usual catalysts for the polyisocyanate polyaddition reactions, surface-active additives, cell regulators, pigments, dyes, flameproofing agents, stabilizers, plasticizers or fungistatic and bacteriostatic agents of the type described by way of example in, for example, European patent 81,701, column 6, line 40 to column 9, line 31.

As already mentioned, the polyisocyanate polyadducts may be produced by various methods. However, they are preferably produced by the one-shot process in which the polyisocyanate component a) is mixed and reacted with component b) or with a mixture of component b) and components d) to f) in suitable mixing units. Basically, the polyisocyanate polyadducts may also be reacted by a "modified one-shot process" in which the polyisocyanate component a) is reacted with part of the isocyanate-reactive compound to form NCO semiprepolymers which are then reacted in a single stage with the mixture of the remaining components containing isocyanate-reactive groups. The production of the foams by the conventional prepolymer process is also possible in principle. In every case, the NCO index (number of NOC groups divided by the number of NCO-reactive groups multiplied by 100) is from 60 to 200, preferably from 80 to 180 and more preferably from 95 to 140. The auxiliaries and additives g) are generally incorporated in component b) or in a mixture of components b) and d) to f) before mixing with the polyisocyanate component a). However, it is also possible in principle to add certain auxiliaries and additives to the polyisocyanate component before it is combined with the other starting materials. In the production of the polyisocyanate polyadducts by the prepolymer process, the auxiliaries and additives are preferably added to the NCO prepolymers.

The polyisocyanate polyadducts may be produced by reaction injection molding, for example as described in German Auslegeschrift 2,622,951, U.S. Pat. No. 4,218,543 or European patent 81,701, although they may also be produced in open molds or by free foaming as slabstock foam or foam sheets.

The process according to the invention may be carried out, i.e. the polyisocyanate polyadducts may be thermoplastically processed, using any known machines suitable for this purpose, such as for example thermoforming presses. However, in the practical application of the process according to the invention, the material does not melt in the manner of "thermoplastics" in the true sense. A liquid, macroscopic phase of relatively low viscosity is not assumed at any time. Suitable thermoforming processes are described, for example, by H. Kaufer in "Machinenmarkt" 88 (1982), pages 1068 to 1071.

The polyisocyanate polyadducts are suitable for molding in accordance with the invention in various starting forms. For example, sheets which have been produced by reaction injection molding in closed sheet molds may be subjected to thermoforming or may be processed in size-reduced form (granules or powder) to new moldings. In addition to thermoforming presses, rollers, calenders, presses, modified extruders and modified injection molding machines may be used. The tools may have to be modified in such a way that the granules can be introduced substantially unmelted into the given mold under the filling pressure. The tools are best modified in such a way that the granules are exposed to powerful shear forces against one another. Examples of such tool modifications are large exit nozzles or large transport passages in extruders or injection molding machines and in the mold feed passages. Shear forces generated shortly before or during filling of the mold promote the cohesion of the molding produced. The same applies of course to the polyisocyanate polyadducts produced without the use of molds. Similarly, sheet-form polyisocyanate polyadducts may be further processed to films of any thickness. The so-called SMC technology is also particularly suitable for processing the products in question.

Moldings or films produced by the process according to the invention may even have a layered structure. To this end, the polyisocyanate polyadduct foams essential to the invention used as starting materials merely form one or more layers of a multilayer structure which, in addition to starting materials according to the invention, comprises other layers of reinforcing materials or other inorganic or organic materials, for example other plastics. Multilayer materials such as these consist of at least 2, preferably 2 to 8 and, more preferably, 2 to 4 layers of thermoplastically moldable material arranged one above the other, the multilayer material optionally comprising additional underlayers, overlayers and/or intermediate layers of fillers and, more particularly, reinforcing materials. Multilayer materials essentially comprising two layers may be produced by the double shot technique. The second material is preferably a comparatively soft polyurethane material. One example of a preferred material is one which consists, on the one hand, of a rigid polyurethane foam containing large quantities of reinforcing material and, on the other hand, of a comparatively soft polyurethane elastomer having a density in the range from 0.8 to 1.3 g/cm$^3$ which has been produced by reaction injection molding in closed molds. The multilayer materials are molded under such temperature and pressure conditions that the individual layers are joined firmly to one another during molding so that a stable composite system is formed. Other plastics suitable for the production of such multilayer materials are described, for example, in German Offenlegungshrift 3,809,524.

The possibility afforded by the invention of thermoplastically molding the polyisocyanate polyadducts mentioned also allows in particular for the production of moldings from granules, chips and/or other small and very small fragments of the type which accumulate as side products or waste, for example in the conventional production and use of moldings based on polyisocyanate polyadducts, and hitherto have been incinerated.

The polyisocyanate polyadducts are processed under a pressure of generally at least 5 bar, preferably in the range from 10 to 400 bar and more preferably in the range from 20 to 100 bar at a temperature of at least 50° C., preferably in the range from 100° to 220° C. and more preferably in the range from 150° to 200° C., with molding times varying from 1 second to 20 minutes.

The temperature and pressure conditions and the processing time must be selected so that the polyisocyanate polyadduct foams are compressed during molding to such a extent that the density of the resulting products is at least 10% and preferably at least 40% higher than the density of the polyisocyanate polyadducts used as starting materials. In the production of composite systems where multilayer materials containing other materials in addition to the polyisocyanate polyadduct foams may also be used, this observation regarding the increase in density of course applies only to the polyisocyanate polyadducts present in the composites.

The compression of the starting materials used in foam form establishes a particularly firm bond between the plastic matrix and the reinforcing materials, particularly where polyisocyanate polyadduct foams containing reinforcing materials g), particularly sheet-form reducing materials, such as glass fiber mats for example, are used.

In the practical application of the process according to the invention for the production of composite materials, however, it is also possible, but not preferred, to use processing aids g) which improve the adhesion between the individual layers of the multilayer material as auxiliaries and additives. Processing aids such as these ares described, for example, in German Offenlegungschrift 3,840,167.

The fact that the foamed starting materials used for molding are compressed during molding also makes molding easier to carry out.

The process according to the invention provides for the production of particularly high-quality end products, particularly film composites, which may be used for a variety of purposes. Thus, the composites according to the invention may be used, for example, in the form of hollow articles for inserts, tubs, containers of various sizes and contents, as covers for instrument panels, control consoles, for flat motor vehicle bodywork elements, such as door panels, side parts, mudguards or hood or trunk lids, and for the production of wheel caps, seat shells or backrests. In flat form, the products of the process according to the invention are also suitable as clip boards, indicator boards with magnetic holders, adhesive boards, protective films and coatings for various purposes. The products of the process according to the invention may also be used in the form of seat shells, backrests, cushions, tubs, trays and similar containers, structural parts for bodywork, chassis, stiffening elements, profiles such as, for example, frames, supports, rigid outer bodywork parts, such as mudguards or hood or trunk lids, wheel caps, wheelhouse linings, stiffening elements for visors, interior door trim for motor vehicles, doors, hinged covers, roofs and similar articles.

In addition, the products obtained by the process according to the invention may be used in the form of small moldings as keyboard elements, hard-elastic seals and gaskets, handle recesses and handles, small damping elements or washers or spacer disks. The products obtained by the process according tot he invention may also be used for the production of reinforced or unreinforced profiles for cable ducts and sealing lips or for the production of any other, solid small moldings.

The invention is further illustrated but is not intended to be limited by the following examples in which all parts and percentages are by weight unless otherwise specified.

EXAMPLES

The following starting materials are used in the following Examples:

Polyisocyanate polyadduct I

A sheet measuring 1,000×6,000×7 mm, density 0.8 g/cm$^3$ (the density of the corresponding non-foamed, unfilled materials was 1.18 g/cm$^3$) which has been produced by reaction of 100 parts by weight of a polyol component with 169 parts by weight of the polyisocyanate component (isocyanate index=110) in a closed sheet mold by reaction injection molding. The inner walls of the sheet mold were coated beforehand with a commercial mold release agent (Fluoricon 35-20, a product of Acmos, Bremen). In addition, two endless glass mats (weight per unit area 450 g/m$^2$) were introduced into the mold so that the made up 16% by weight of the total weight of the molding. The glass fiber mats were of the U 816 type manufactured by Gevetex, Herzogenrath, Federal Republic of Germany.

The polyol component consisted of a mixture of 20 parts by weight of a propoxylation product of trimethylol propane having an OH value of 1,000, 30 parts by weight of a propolylation product of trimethylol propane having an OH value of 865, 34 parts by weight of an alkoxylation product of a mixture of 83.5% by weight trimethylol propane and 16.5% by weight propylene glycol (OH value 42) in the production of which first 7.5% by weight propylene oxide and then a mixture of 30% by weight ethylene oxide and 40% by weight propylene oxide and, finally, 22.5% by weight propylene oxide were added on, 2.4 parts by weight of a commercially available polysiloxane stabilizer (SR 242, a product of BP), 1.15 parts by weight N,N-dimethyl benzylamine, 0.30 part by weight N,N-dimethyl cyclohexylamine, 0.15 part by weight o-phosphoric acid, 5.0 parts by weight of the reaction product of 2 mol tall oil and 1 mol 3-dimethyl aminopropylamine, 2.15 parts by weight water and 5 parts by weight of a black paste based on carbon black.

In addition, the polyol component was charged before use with 15% by volume air.

The polyisocyanate component consisted of a polyisocyanate mixture of a diphenyl methane series having a viscosity of 100 mPa.s at 23° C. and an NCO content of 31% by weight.

The mold temperature was 60° C. The temperature of each of the starting materials mentioned was 25° C. The quantity of reaction mixture introduced into the mold was gauged in such a way that the density mentioned above was obtained.

Polyisocyanbte polyadduct II

Polyisocyanate polyadduct II corresponded in its chemical composition to polyisocyanate polyadduct I, except that the mold was provided with the following three-layer material before filling with the reaction mixture:

a layer of U 816 endless glass mat, an intermediate layer of polyamide cloth (Enkamat, Type 70 10)

a U 816 endless glass mat.

The total quantity of reinforcing materials introduced into the mold corresponded to 28.5% by weight, based on the total weight of the resulting molding.

The quantity of reaction mixture introduced into the mold was gauged in such a way that the resulting molding had a density of 0.55 g/cm$^3$.

EXAMPLE 1

The foamed, sheet-foam polyisocyanate polyadduct I was preheated for 5 minutes at 170° C. in a heating cabinet and then introduced into a compression mold preheated to 190° C. (asymmetrical pyramid mold, height 4 cm, with a square base 9.5 cm wide, material brass). The press was then slowly closed and, after closure, the molding was subjected to a pressure of 70 bar.

After 2 minutes in the press, the moldings was cooled under pressure to below 100° C. in the press and then removed. The projecting edge was cut off.

Test specimens were taken from the molding and tested; the results are shown in the following Table:

| Test value | | Semifinished product | Molding |
| --- | --- | --- | --- |
| Density | g/cm$^3$ | 0.8 | 1.1 |
| Torsion modulus | | | |
| RT | MPa | 900 | 1,600 |
| 120° C. | MPa | 200 | 400 |
| (DIN 53 445) | | | |
| Elongation at break | % | 7 | 9 |
| Ultimate tensile strength | MPa | 15 | 35 |
| (DIN 53 504) | | | |

The non-transparent semifinished product becomes transparent during production of the molding, so that the inserted glass mats can clearly be seen. The molding shows no shifting or thinning out of the glass mats at the corners and edges.

EXAMPLE 2

A sheet of polyisocyanate polyadduct II having a density of 0.55 g/cm³ and a thickness of 7 mm was preheated for 5 minutes at 170° C. in a heating cabinet and then introduced into the press preheated to 150° C. between parallel plates. The press was then slowly closed and, after closure, the sheet was subjected to a pressure of 70 bar.

After 2 minutes in the press, the molding—an approximately 3 mm thick compact sheet—was cooled under pressure to below 100° C. in the press and then removed.

Test specimens were taken from the molding and tested; the results are shown in the following Table:

| Test value | | Semifinished product | Molding |
|---|---|---|---|
| Density | g/cm³ | 0.549 | 1.317 |
| Torsion modulus | | | |
| RT | MPa | 280 | 1,422 |
| 120° C. | MPa | 120 | 422 |
| Elongation at break | % | 2 | 2 |
| Ultimate tensile strength (DIN 53 504) | MPa | 23 | 55 |
| Modulus of elasticity in tension | MPa | 920 | 2,890 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of moldings or films based on foamed polyisocyanate polyadducts comprising thermoplastically molding said polyadduct at temperatures of at least 50° C. under pressures of at least 5 bar in a suitable forming tool, wherein the foamed polyisocyanate polyadducts used are those which optionally contain fillers and/or reinforcing materials in a quantity of up to 80% by weight, based on the total weight, have a density of 0.3 to 1.2 g/cm³ and have been obtained by reaction of
   a) organic polyisocyanates and
   b) aliphatic or cycloaliphatic polyols which may contain ether and/or ester groups and, and which have molecular weight in the range from 92 to 1,799 and hydroxyl functionalities of at least 3,
   c) blowing agents,
optionally with one or more of the following components d) through g):
   d) compounds having molecular weights of 1,800 to 12,000 which, on a statistical average, contain at least 2.5 isocyanate-reactive groups,
   e) diamines containing two primary and/or secondary aromatically bound amino groups having molecular weights of from 108 to 400,
   f) aliphatic diols, cycloaliphatic diols, aliphatic polyamines an d/or cycloaliphatic polyamines which may contain ether groups and which have molecular weights of from 60 to 1,799
   g) other auxiliaries and additives known per se from polyurethane chemistry,
in one or more stages at an isocyanate index from 62 to 200, with the proviso that component b) is used in such a quantity that the total quantity of component b) is at least 5% by weight, based on the weight of components a), b) and d) through f) and the temperature and pressure conditions prevailing during molding of the material are selected so that the resulting moldings have a density at least 10% higher than the density of the polyisocyanate polyadducts used.

2. The process of claim 1, wherein the polyisocyanate polyadducts to be molded contain sheet-form reinforcing materials in a quantity of up to 80% by weight, based on the total weight.

3. The process of claim 1, wherein the polyisocyanate polyadducts to be molded contain glass fiber mats in a quantity of up to 80% by weight, based on the total weight.

4. The process of claim 1, wherein the polyisocyanate polyadducts to be molded are present in the form of foam sheets which have been produced by reaction of the starting materials in closed molds by reaction injection molding.

5. The process of claim 1, wherein the polyisocyanate polyadducts to be molded are present in the form of laminates comprising one or more layers of other organic or inorganic materials.

6. The process of claim 1, wherein the polyisocyanate polyadducts to be molded have been produced using aliphatic or cycloaliphatic polyols b) optionally containing ether and/or ester groups which have molecular weights of 92 to 399 and hydroxyl functionalities of 3 and/or 4, and wherein the quantity of component d) is at least 10% by weight, based on the weight of components a), b) and d) to f).

7. A molded product produced according to the process of claim 1.

* * * * *